UNITED STATES PATENT OFFICE.

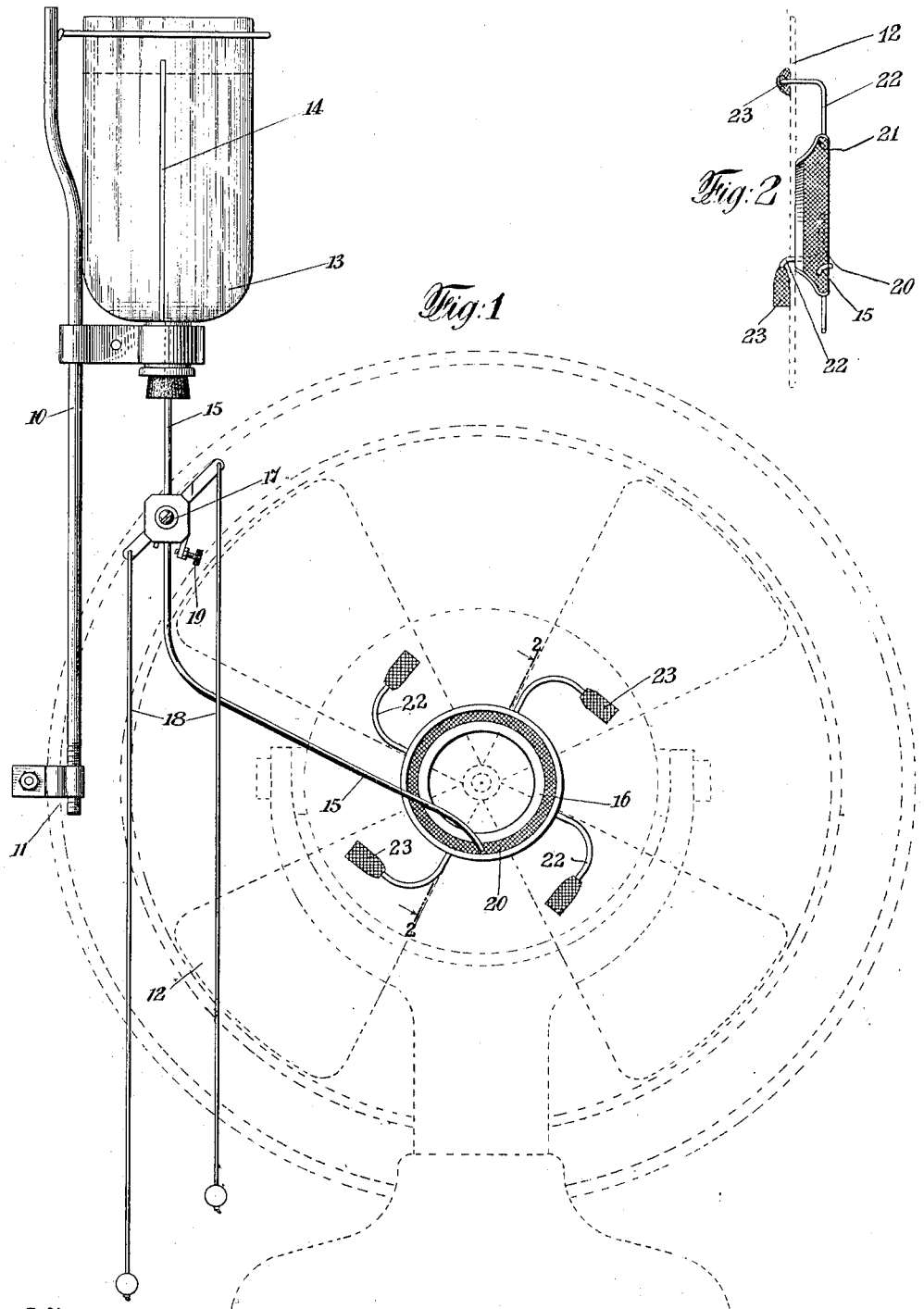

EMIL E. SIEFERT, OF NEW YORK, N. Y.

ATTACHMENT FOR DISTRIBUTING VAPORS.

1,066,851.      Specification of Letters Patent.      Patented July 8, 1913.

Application filed August 3, 1912. Serial No. 713,056.

*To all whom it may concern:*

Be it known that I, EMIL E. SIEFERT, a citizen of the United States, and a resident of New York city, in the county of New York and State of New York, have invented certain new and useful Improvements in Attachments for Distributing Vapors, of which the following is a specification.

The invention relates to apparatus for distributing the vapor of liquids of various kinds, such for example, as water, perfumes and medicated liquids, disinfectants, etc.; and more particularly to an attachment for this purpose which may be readily and conveniently secured to an electric fan or ventilator of the usual type, the same being adapted to project the vapor where desired.

It has for its object to so construct the apparatus that the flow of liquid may be readily controlled and entirely closed off without interference with the fan proper, which operates independently thereof; and, furthermore, to obviate any leakage during the time the fan is inactive, which leakage frequently occurs in those types wherein the liquid container is arranged to rotate with the fan.

The nature of the invention will best be understood when described in connection with the accompanying drawings, in which—

Figure 1 is a rear elevation of the attachment secured to an electric fan, which is indicated in phantom lines. Fig. 2 is a transverse section taken on the line 2—2, Fig. 1.

Similar characters of reference designate corresponding parts throughout the several views.

Referring to the drawings, 10 designates a bracket removably attached to the frame or guard 11 of an electric fan 12. This bracket supports a bottle 13, or other suitable container, for the liquid it is desired to vaporize and distribute, the bottle being placed in inverted position and provided with a vent 14 extending through the cork and above the surface of the liquid contained in the said bottle. An outlet or supply tube 15 delivers the contents of the bottle to a distributer 16 secured to the arms extending from the hub at the back of the fan, and is adapted to be rotated thereby.

The supply of liquid is controlled by a valve 17 operated by chains 18 to open or close the same; and the flow of liquid is regulated by an adjustable screw 19. The tube 15 extends to the central portion of the fan, at the rear thereof, and is open but unattached to the said distributer, clearing all of the rotating parts of the fan. The flow of liquid therethrough is so adjusted that the desired amount of vapor will be projected by the fan, the drops of liquid falling upon a gauze covering 20 arranged over the open portion of an annular groove 21 formed in the distributer, the same affording a porous retainer for the liquid. The gauze is of sufficiently fine mesh to effectively break up the liquid as it is dropped thereon and to prevent dust and the like from passing into the distributer.

To the annular groove 21 is connected a plurality of distributing tubes 22 corresponding to the blades of the fan. These tubes are secured to and pass through the respective blades, and remove the liquid, or vapor, from the distributer, delivering the same at the front of the blades, substantially midway thereof, and preferably through a porous end 23 as may be constructed of gauze, similar to that employed in connection with the distributer, wrapped several times about the discharge end of said tubes. In this manner, the liquid is completely vaporized and the vapor is propelled by the current of air set up by the fan. If it be desired to employ the fan without the vapor, this is effected by operating the proper chain 18. Should the fan be at rest, no liquid can leak from the attachment, as only so much liquid is supplied to the distributer as is immediately employed.

The attachment is readily installed upon existing fans, and the renewal of the liquid is conveniently effected.

I claim—

1. An attachment for fans, comprising a suitable container for liquid and adapted to be secured to the frame of said fan; a porous distributer secured to the blades of the fan, rotating therewith and adapted to receive the liquid and break up the same; a plurality of tubes communicating with the distributer and carried by the blades of the fan; and means to convey the liquid from the container to the distributer.

2. An attachment for fans, comprising a suitable container for liquid and adapted to be secured to the frame of said fan; a porous distributer secured to the blades of the fan, rotating therewith and adapted to receive the liquid and break up the same; a plurality of tubes communicating with the distributer and carried by the blades of the fan; and means to convey the liquid from the container to the distributer, the discharge end of said means being free and unattached to the distributer and adapted to drop the liquid thereon.

3. An attachment for fans, comprising a suitable container for liquid and adapted to be secured to the frame of said fan; a distributer secured to the blades of said fan and rotating therewith, said distributer being provided with an annular groove, and a gauze covering for the same to receive the liquid and break up the same; a plurality of tubes communicating with the said groove and carried by the blades of the fan; and means to convey liquid from the container to the distributer.

4. An attachment for fans, comprising a suitable container for liquid and adapted to be secured to the frame of said fan; a porous distributer secured to the blades of the fan, rotating therewith and adapted to receive the liquid and break up the same; a plurality of tubes communicating with the distributer, carried by the blades of the fan and extending therethrough, and a gauze covering about the discharge end of each of said tubes; and means to convey liquid from the container to the distributer.

5. An attachment for fans, comprising a suitable container for liquid and adapted to be secured to the frame of said fan; a distributer secured to the blades of said fan and rotating therewith, said distributer being provided with an annular groove, and a gauze covering for the same to receive the liquid and break up the same; a plurality of tubes communicating with said groove, carried by the blades of the fan and extending therethrough, and a gauze covering about the discharge end of each of said tubes; and means to convey the liquid from the container to the distributer, the discharge end of said means being free and unattached to the distributer.

Signed at New York in the county of New York and State of New York this 1st day of August A. D. 1912.

EMIL E. SIEFERT.

Witnesses:
 FREDK. F. SCHUETZ,
 L. RAYMOND ANDERSON.